Sept. 29, 1925.
J. E. ROY
1,555,760
GRAIN BIN ATTACHMENT FOR HARVESTER THRASHERS
Filed Feb. 21, 1925  2 Sheets-Sheet 1
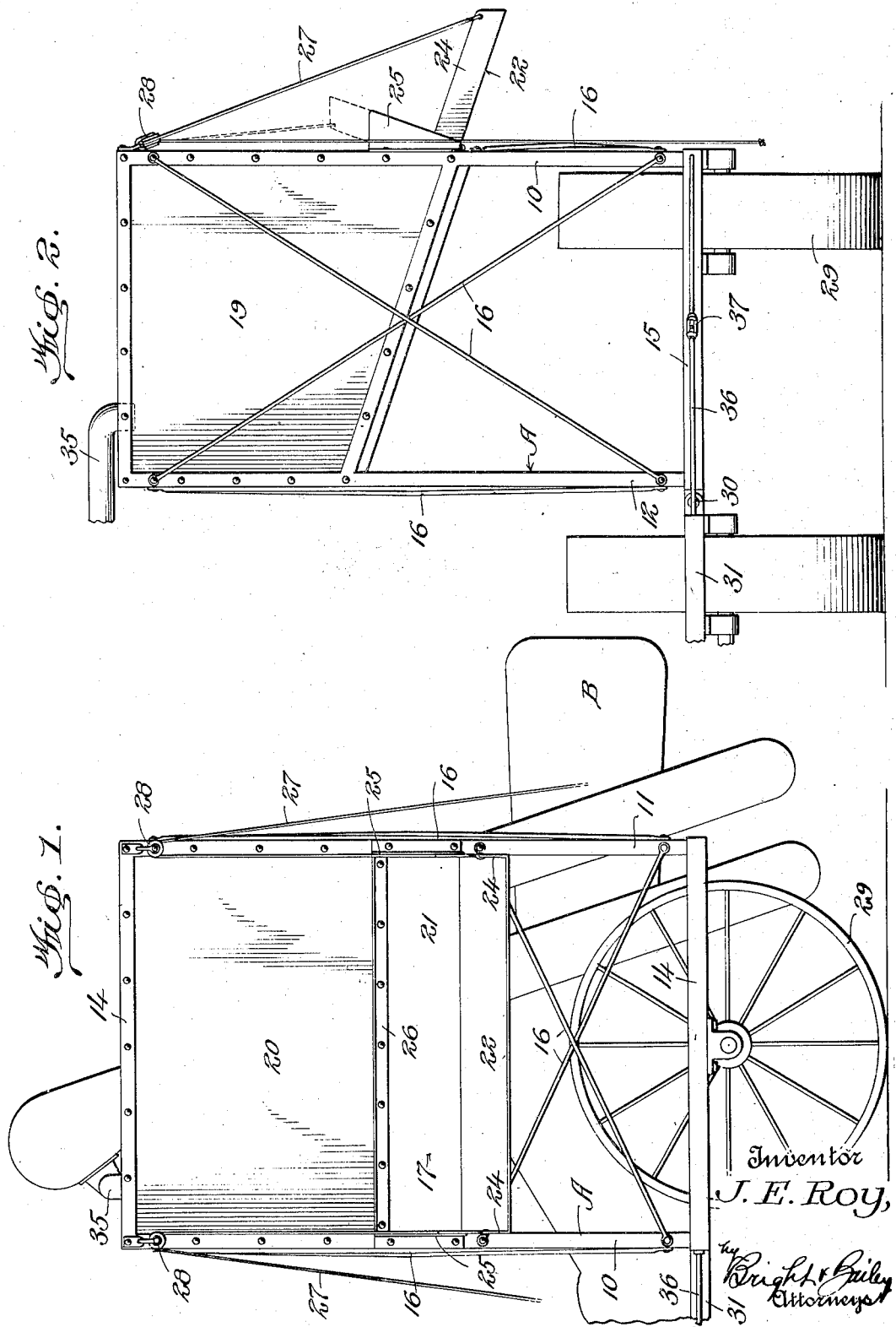

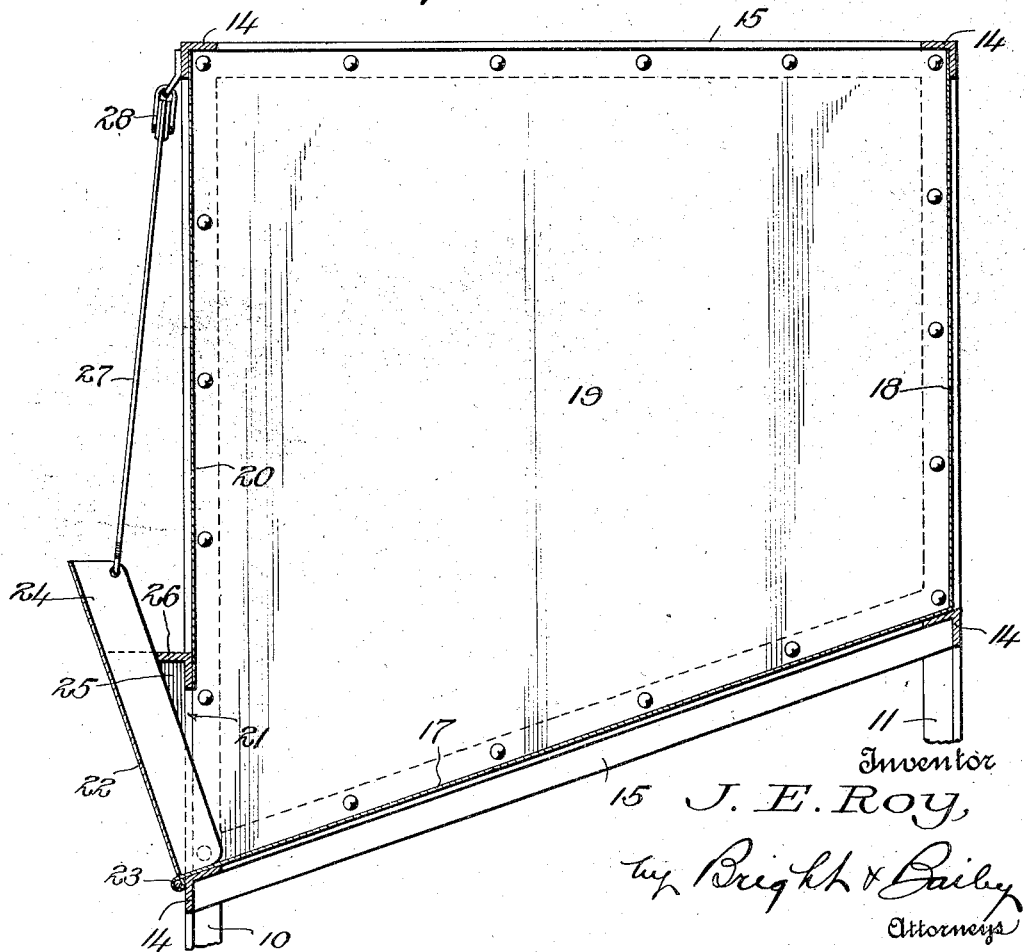

Patented Sept. 29, 1925.

1,555,760

UNITED STATES PATENT OFFICE.

JOHN E. ROY, OF CHEROKEE, OKLAHOMA, ASSIGNOR OF ONE-HALF TO HENRY C. DOHERTY, OF BURLINGTON, OKLAHOMA.

GRAIN-BIN ATTACHMENT FOR HARVESTER-THRASHERS.

Application filed February 21, 1925. Serial No. 10,815.

*To all whom it may concern:*

Be it known that I, JOHN E. ROY, a citizen of the United States, and resident of Cherokee, in the county of Alfalfa and State of Oklahoma, have invented certain new and useful Improvements in Grain-Bin Attachments for Harvester Thrashers, of which the following is a specification.

My invention relates to a grain-bin attachment for harvester-thrashers, and my purpose, generally speaking, is to provide means whereby grain delivered by such machines may be handled more expeditiously than heretofore.

The bin is carried by a frame which is supported at one side by a traction wheel or wheels and at its other side is adapted to be hinged to a harvester-thrasher whereby it may tilt to relieve the harvester-thrasher of strain when passing over uneven ground, the bin being disposed in receiving relation to the grain discharge spout of the harvester-thrasher and being equipped with means whereby grain accumulating therein may conveniently be delivered to wagons or other vehicles for transportation.

With the foregoing general scheme in view, it is my more specific purpose to provide a grain bin attachment as mentioned, which is of simple and durable construction, relatively cheap and easy to produce, which may readily be attached to and detached from harvester-thrashers of different types, and which will eliminate practically all handling and loss of grain in the field.

With the foregoing and other purposes in view, my invention consists in the novel features of construction, combination and arrangement of parts as will be hereinafter more fully described, illustrated in the accompanying drawings and defined in the appended claims.

In the drawings, wherein like characters of reference denote corresponding parts in the different views.

Figure 1 is a side elevation of a fragment of a harvester-thrasher showing my grain-bin attachment operatively associated therewith;

Figure 2, a front elevation of the bin and a fragment of the thrasher-harvester, showing the operative connection between the two;

Figure 3, a fragmentary plan view showing in detail the hinged connection between the bin supporting frame and the harvester-thrasher; and Figure 4, a section through the grain bin.

As shown in the drawings, my device consists preferably of a rectangular, angle-iron frame A, composed, in the present instance, of four corner uprights 10, 11, 12 and 13, connected together at their upper and lower ends and intermediately by longitudinal and transverse spacing and bracing members 14 and 15, respectively, while in addition each adjacent pair of uprights is connected together by diagonal cross rods or braces 16 which impart increased rigidity to said frame.

The rear intermediate longitudinal member 14 is disposed above the corresponding front longitudinal member 14, and the intermediate transverse members 15, which extend between the members 14 and which support the floor 17 of the grain bin, are inclined between said longitudinal members so as to support the floor of the grain bin at a downward inclination towards the front of the frame.

A rear wall 18, end walls 19 and a front wall 20, all formed preferably from sheet metal, riveted, bolted or otherwise secured between the uprights 10, 11, 12 and 13 above the floor 17, serve to complete the bin, which latter is open at its top and is provided in its front wall 20, directly above the floor 17, with a discharge opening 21 of any suitable height extending preferably the full length of the bin.

A closure 22 for the discharge opening 21 is hinged as at 23 in any suitable manner either directly to the floor 17 or to another part of the frame or bin structure so that it may be lowered from the full line position shown in Fig. 4, in which position it closes the discharge opening, to the full line position shown in Fig. 2 in which position it constitutes a continuation of the inclined bin floor 17 and produces in effect a spout for directing grain flowing from the bin through the discharge opening 21 into a wagon or other vehicle or container disposed to receive grain from said bin through said discharge opening. Flanges 24 are formed at the sides of said closure to prevent grain from flowing over the sides of the closure when the latter is lowered, and these flanges cooperate with plates 25 extending outward from the frame or bin adjacent to each side of the discharge opening 17, respectively, and with an angle iron front wall stiffening member 26 secured to the front wall 20 directly over said discharge opening 17 to prevent any loss of grain through said discharge opening when the closure is in the raised position shown in Fig. 4.

Ropes or cables 27 are secured to opposite sides of the closure 22 and are extended upward and over pulleys 28 at the top of the bin or frame and thence downward to provide means operable from below the bin to raise the closure from the position shown in Figure 2, to which position it will fall under the influence of gravity, to the position shown in Fig. 4, in which position it may be secured by said ropes or cables.

A ground engaging wheel 29 is suitably mounted on the lower portion of the frame A near the front of the latter to support the major portion of the weight of the frame and bin, while said frame, at its rear, is adapted to be hinged as at 30 to the frame 31 of a harvester-thrasher, indicated generally at B, whereby the remaining portion of its weight and that of the bin is sustained by the harvester-thrasher. In the present instance a hinged connection between the frames A and 31 is effected through the instrumentality of cooperating U-shaped members 32, 33 secured to the frame 31 and to the lower, inner longitudinal member 14 of frame A and having pintles 34 extending therethrough, but such hinge connection obviously might be effected in any other suitable or desired manner.

As is understood, my attachment is connected to the harvester-thrasher with the grain bin in receiving relation to the grain discharge spout 35 of the harvester-thrasher, so that grain delivered by the latter will accumulate in said bin, and thus be stored ready to be delivered whenever desired by manipulation of the closure 22.

Extending forwardly from an outer portion of frame A towards the front of the harvester-thrasher and connecting the frame 31 of the latter with frame A, is a draft rod 36 including a turnbuckle 37 whereby it may be adjusted to most effectively relieve the frame of the harvester-thrasher of any side draft due to the attachment of the device of my invention thereto.

The hinge connection between the frames A and 31 obviously allows the frame A to tilt when passing over rough or uneven ground and thus relieves the harvester-thrasher of any undue strains, while it is believed to be equally obvious that by the use of my device practically all handling and loss of grain in the field may be eliminated with a consequent saving in both time and labor.

I claim:

1. In combination with a harvester-thrasher, a grain bin including a frame hinged at one side thereof to a side portion of the harvester-thrasher with the bin disposed in grain receiving relation to the grain discharge spout of the harvester-thrasher, a supporting wheel at the other side of said frame, means for effecting discharge of grain from said bin, and a draft rod extending from said frame forwardly with respect to the harvester-thrasher and secured to the latter.

2. A grain bin attachment for harvester-thrashers comprising a bin supporting frame adapted to be secured to a harvester-thrasher with the bin disposed in grain receiving relation to the grain discharge spout of the harvester-thrasher, said bin including a rear wall, end walls and a front wall and a floor inclined downwardly towards a discharge opening in said front wall, a closure for said discharge opening having flanges at the sides thereof and movable to a position in which it forms a continuation of said inclined floor and thereby constitutes a spout for directing grain flowing through said opening into a receptacle arranged in grain receiving relation thereto, outwardly extending flanges at the sides of said discharge opening with which the flanges at the sides of said closure cooperate to prevent flow of grain from the bin through said discharge opening when the closure is in closing relation to said opening, and a front wall stiffening member secured to said front wall directly above the discharge opening therein and also cooperating with said closure and said flanges to prevent flow of grain from the bin through said discharge opening.

3. In combination with a harvester-thrasher, a grain bin attached at one side to a side portion of said harvester thrasher in grain receiving relation to the grain discharge spout of the harvester thrasher, means supporting the other side of said bin, a draft rod connecting said bin with said harvester-thrasher, and means to vary the effective length of said rod for the purpose specified.

4. An attachment for harvester-thrashers comprising a bin adapted to be secured to a harvester-thrasher in grain receiving relation to the grain discharge spout thereof, said bin having a discharge opening and a pivoted closure therefor adapted to be swung from a position overlying said opening to a position in which it constitutes a spout for directing grain flowing through said opening into a receptacle, and a stiffening member for the wall of said bin in which said opening is formed cooperating with said closure to prevent flow of grain through said opening when the closure is in a position overlying said opening.

In testimony whereof I hereunto affix my signature.

JOHN E. ROY.